United States Patent [19]

Engel

[11] Patent Number: 4,493,470
[45] Date of Patent: Jan. 15, 1985

[54] RAPID ACTION CLAMPING FOR COOPERATION WITH SLOT TRACKS

[75] Inventor: Hinrich Engel, Bremen, Fed. Rep. of Germany

[73] Assignee: Vereinigte Flugtechnische Werke GmbH, Bremen, Fed. Rep. of Germany

[21] Appl. No.: 521,458

[22] Filed: Aug. 8, 1983

[30] Foreign Application Priority Data

Aug. 30, 1982 [DE]  Fed. Rep. of Germany ....... 3232234

[51] Int. Cl.³ ............................................. A47B 97/00
[52] U.S. Cl. ............................ 248/503.1; 244/118.6; 410/105
[58] Field of Search ............... 244/118.1, 118.5, 118.6, 244/122 R; 410/101, 103, 104, 105, 115, 113, 114; 248/615, 616, 680, 681, 677, 188.4, 188.8, 500, 503.1, 503, 510; 403/145–148; 411/114, 427, 402–407, 204–208, 345; 292/251

[56] References Cited

U.S. PATENT DOCUMENTS

| | | | |
|---|---|---|---|
| 738,660 | 9/1903 | Chittum | 411/208 |
| 1,529,564 | 3/1925 | Vinner | 411/205 |
| 3,212,457 | 10/1965 | Looker | 410/105 |
| 3,241,501 | 3/1966 | Watts | 410/105 |
| 3,455,526 | 7/1969 | Sho Orii | 248/188.4 |
| 3,480,311 | 11/1969 | Lanham, Jr. | 292/251 |
| 4,088,355 | 5/1978 | Dey | 292/251 |
| 4,109,891 | 8/1978 | Grendahl | 410/105 |
| 4,396,175 | 8/1983 | Long et al. | 248/503.1 |

FOREIGN PATENT DOCUMENTS

| | | | |
|---|---|---|---|
| 1029623 | 5/1958 | Fed. Rep. of Germany | 248/677 |
| 950783 | 2/1964 | United Kingdom | 248/616 |

*Primary Examiner*—Galen L. Barefoot
*Attorney, Agent, or Firm*—Ralf H. Siegemund

[57] ABSTRACT

The device disclosed is a rapid action clamping element for locking, for example, latch elements to the floor in an aircraft provided with slot tracks. The element includes a base element holding two mushroom headed posts, there being a spring biased cylindrical post in between and a crown ring mounts the base element to the latch housing under determination of the degree of projection of the mushroom headed posts. A two position handle permits spring bias protraction of the cylindrical posts for insertion in one of the apertures in the slot track while permitting retention of a retraction against the spring in the other position.

4 Claims, 2 Drawing Figures

RAPID ACTION CLAMPING FOR COOPERATION WITH SLOT TRACKS

BACKGROUND OF THE INVENTION

The present invention relates to a rapid action clamping element for locking and fixedly positioning latch element and other components on an apertured rail or slot track.

Clamping elements of the type to which the invention pertains are used in aircraft particularly for fastening, for example, pieces of freight or chairs to the floor. Herein it is customary to use rails which, for example, are provided with a longitudinal slots having local widenings so that, in top elevation, the rail appears to have a sequence around apertures which however are interconnected by a narrower through-opening. These rails or tracks are usually placed into the floor so that the upper surface is more or less flush with the remainder of the floor or slightly recessed.

The clamping elements, used for fastening equipment to the rails, have mushroom shaped posts which are fixedly positioned in the clamping element and in addition axially adjustable cylindrical posts are provided as lateral constraint. The posts and here particularly the mushroom shaped posts are arranged corresponding to the aperture pattern in the rail so that the "mushroom" heads of the posts can easily pass through appropriately spaced widened portions in the rail and to be clamped under the narrower portions which extend between adjacent two round apertures or bores of the rail trade. The cylindrical posts are used to position the respective clamping device in longitudinal direction, and one uses here customarily two such cylindrical posts having a distance which also is an integral multiple of the aperture pattern in the rail. They just lock the respective clamping element in that once inserted they cannot be displaced longitudinally because the respective cylindrical posts have a wider diameter than the narrow slot portion in between two apertures, while on the other hand, the mushroom shaped posts have a stem whose diameter is sufficiently small to pass along the through portion of the aperture arrangement in the rail. A typical clamping element used in the prior art is disclosed in German printed patent application No. 2,556,000.

DESCRIPTION OF THE INVENTION

It is an object of the present invention to provide a new and improved rapid action clamping element for cooperation with an aperture rail or slot track permitting easy clamping without utilization of tools while the element so clamped is held and fixed without play.

It is a particular object of the present invention to provide a new and improved rapid action clamping element for locking and fixing dogs or latch elements or the like upon slot tracks such as found in aircraft and under utilization of mushroom shaped posts shaped arranged under the clamping element and at a distance from each other which is an integral multiple of the repetition rate of slots in the track.

In accordance with the preferred embodiment of the present invention, the latch element or other component to be fixed to the slot track as per the specific object is to include a base element provided with an annular thread upon which an annulus is threaded and spring loaded, the base element is provided with two mushroom shaped or headed posts being connected thereto by threading under utilization of a counterplate bearing against the base, and a cylindrical posts is provided in between the two mushroom shaped posts, the cylindrical post being spring loaded, i.e., it is provided with a locking spring which references the cylindrical post against the counterplate and ensures a locking insertion into the rail; a handle is provided on the other side of the counterplate and configured to hold the cylindrical post against the force of the locking spring in one position, while ensuring locking action of the spring in the other position. The annulus is crown shaped and positions the base with respect to the housing of the latch element and the floor against the force of the spring loading the annulus; upon turning of the crowning, the mushroom shaped posts and the latch element housing are clamped and held against opposite sides of the slot track. In order to avoid undesired turning, the handle may be locked into the annulus in that it is placed between the springs of the crown ring.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
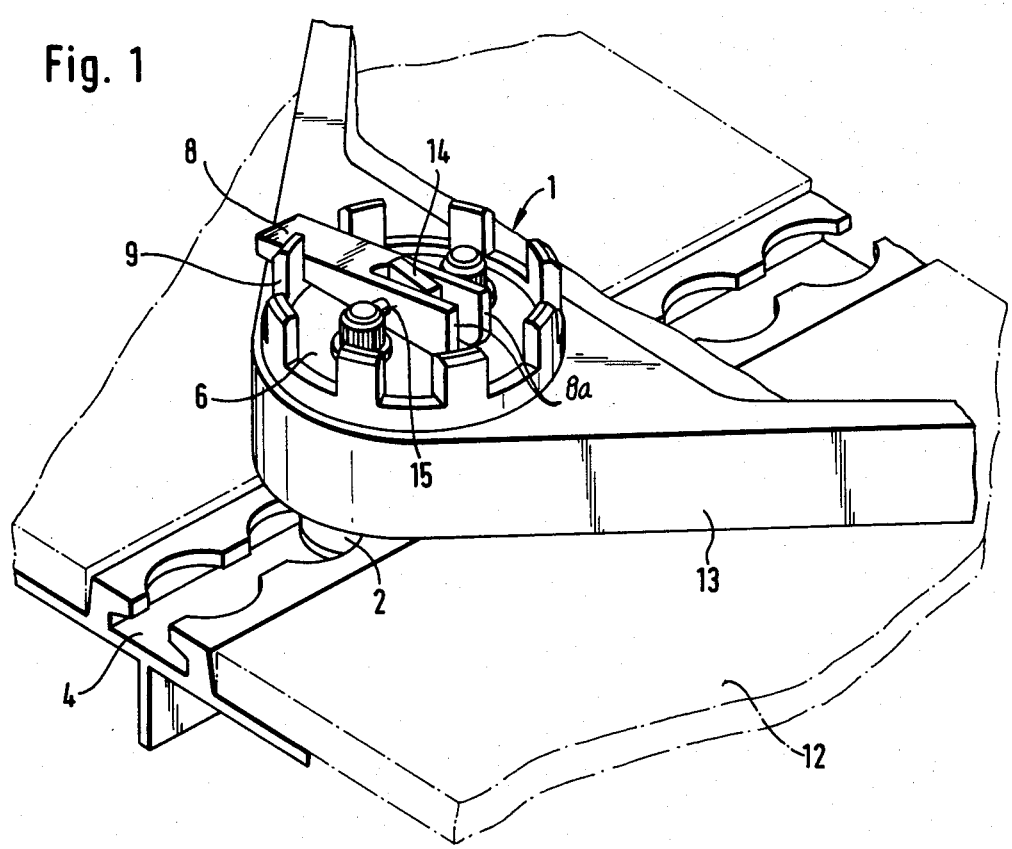
FIG. 1 illustrates a perspective view of the rapid action clamping element in accordance with the preferred embodiment of the present invention for practicing the best mode thereof, the element being shown clamped to a slot track.

Proceeding now to the detailed description of the drawings. Reference numeral 1 refers generally to the rapid action clamping element which is mounted in a latch housing or dog element 13. This element may be of the type disclosed by me and others in the U.S. patent (Ser. No. 339,129 filed May 13, 1982 now U.S. Pat. No. 4,457,649). The rapid action connector 7 of that patent can be constructed as presently disclosed. The rapid action clamping element 1 includes a base element or body 5, two mushroom shaped or headed posts 2 and 2', a cylindrical post 3 and a crown ring 9. This annular element 9 is basically a ring having axially extending azimuthally spaced projections giving it a crown like appearance. All these elements are connected to the base body or element 5 in such a manner that they interact mechanically to be described next.

The two mushroom shaped posts 2 and 2' are introduced and inserted into the base body 5, such that their axial spacing is equal to or an integral multiple (e.g.-two-) of the aperture spacing in the slot track 4. The slot track 4 is inserted in the floor 12 of, for example, an aircraft. The slot track 4 is comprised of a series of round apertures each having a particular diameter and adjacent ones are interconnected in the length extension of the rail 4 by narrower portions establishing a through-slot of which the round apertures are local widenings. The centers of these widenings establish a particular pattern of regularity, and the spacing between two adjacent such apertures is the parameter determining the spacing of the two posts 2 and 2' the latter being an integral multiple of the former.

The two projecting elements of mushroom configurations have a rather long stem and wing-nuts or the like at the opposite end (opposite to the mushroom head) fasten the elements 2 and 2' against a counterplate 6, whereby the wing-nuts urge the counterplate from one direction against the body 5 while a shoulder of a collar in each of the elements 2 and 2' near the respective mushroom head is thereby urged against the body 5 from the other side. This connection is a tight and secure one.

A cylindrical post 3 is centrally disposed between the two projecting elements 2 and 2'. The cylindrical post 3 is disposed inside base element or body 5 in such a manner that it can be displaced therein in axial direction. The post 3 has a shoulder against which bears one end of a compression spring 7 provided for locking. The other end of that spring bears against the plate 6 from the inside as seen with respect to the body 5. The cylindrical post 3 has an upper portion 14 which is configured to have a rectangular cross-section and that cross-section portion 14 has in its upper portion a bore 15.

Figure 2:
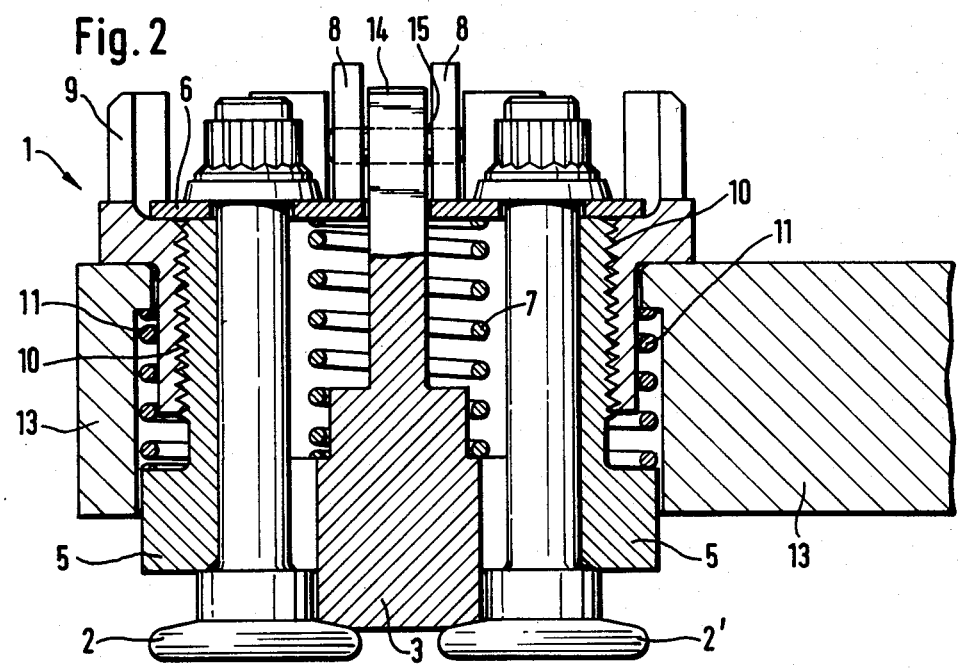
FIG. 2 illustrates a cross-section through the rapid action clamping element shown in FIG. 1.

The bore 15 receives a pin for journaling a handle 8. The handle 8 is constructed to either lie more or less flat or to stand upright on two support ends 8a. Upon lifting, handle 8 lifts the cylindrical post 3 against the force of the spring 7 until the cylindrical post is fully receded from the slot track 4. FIG. 2 shows post 3 in the protracted position wherein it rests on the heads of posts 2 and 2'. The clamping element is unlocked when the post 3 is retracted and can, therefore, be moved about, i.e., it can be lifted off the track 4 or longitudinally shifted. The post 3 is held in the retracted position when level 8 stands upright its support surface ends 8a resting on plate 6.

In order to clamp the element 1, i.e., in order to fix the longitudinal position thereof in relation to the slot track 4 handle 8 is forced down and now the cylindrical post is forced down by expanding spring 7 and can be inserted into one of the round apertures of the slot track 4. In view of the continued action of spring 7, the post 3 is now held in the protracted position and thereby locks the element 13 to the rail track.

In order to secure the clamping element against being pulled out of the latch housing 13, the crown ring 9 is threaded from the outside upon the housing 5 or base. Securing base 5 against pull out is, however, only one of the functions of ring 9. Reference numeral 10 refers to the threaded connection. Once threaded into or onto the base element 5 lever 8 can be situated between two prongs of the crown thereby locking the same against being turned further. However, the plate 6 is sufficiently wide and the clamping action by the wing-nuts or the cap-nuts by means of which the posts 2 and 2' are fastened, also cause the crown 9 to be held against unthreading. On the other hand, the crown ring 9 acts against a compression spring 11 which bears with one end against a shoulder along the outside of base element 5. The other end of the spring 11 bears against an internal shoulder in the latch housing 13. An outside shoulder of crown ring 9 fits on top of the latch housing 13.

As now the crown ring 9 is being turned, the element, base or body 5 is shifted in longitudinal direction inside the latch housing 13 against the force of the spring 11. It should be noted that the crown ring 9 can be threaded deeper onto the base 5, i.e., it does not have to remain in abutment with the counterplate 6. The counterplate 6 merely prevents accidental removal of the crown ring 9 by unthreading. The crown ring 9 can be threaded onto the base element 5 to the extent full compression of the spring 11 permits.

The crown ring 9 is provided in its upper end with an overhanging shoulder which bears against the latch housing 13. Thus, the degree of threading the crown ring onto the base 5 determines the projection of the latter below the case or housing 13 and that in turn determines the extent of downward projection of the mushroom posts 2 and 2'.

Turning now to the overall operation it is assumed that initially the handle 8 has been turned up to stand erect so that the cylindrical posts 3 is retracted; the flat ends 8a of the handle 8 permit the handle to stand so that in fact the post 3 remains in the retracted position, spring 7 being compressed accordingly. The latch element 13 and particularly the clamping element 1 thereof, are now placed in the desired position on and along the rail 4. The two posts 2 and 2' are aligned with two apertures in the slot track 4 and the heads of the posts 2 and 2' are inserted into two different (e.g., adjacent) round apertures of the trade or rail 4.

Next, crown ring 9 is turned such that the body 5 is retracted relative to the crown ring, and since the shoulder of the crown ring sits on the latch housing 13, the posts 2 and 2' are retracted in relation thereto when the crown ring 9 is turned. This action effectively clamps the mushroom heads against the rail 4 while the latch housing 13 is urged and forced against the floor 12. After this clamping position and condition has been attained, the lever or handle 8 is folded down whereby, of course, it must come into a resting position in between two prongs of the crown ring 9. This fold-down action of lever or handle 8 permits the spring 7 to decompress forcing the cylindrical post 3 into the aperture that is in between the two narrow aperture portions against which the two heads of the two mushroom posts 2 and 2' are clamped. As shown in FIG. 2, the front end of the cylindrical post 3 will come at rest against the heads of the mushroom posts 2 and 2', because these heads of course still project into the space underneath the particular round aperture into which the post 3 is inserted.

The invention is snot limited to the embodiments described above, but all changes and modifications thereof not constituting departures from the spirit and scope of the invention are intended to be included. This includes particularly components other than the latch element 13.

I claim:

1. Rapid action clamping element for positioning and locking components in relation to a slot track comprising:

a latch housing being one of the components;

a base element resiliently held in and biased for engagement with the latch housing and having an external annular threading and provided for mounting two mushroom headed posts projecting in an aligned relationship from below the base element;

a cylindrical post disposed in between the two mushroom headed posts, the cylindrical post being spring biased;

a plate held against the base element on a side opposite the side from which the mushroom heads of the mushroom headed posts project, said two mushroom headed posts being secured to said plate, said plate having an opening through which an end of the cylindrical post projects;

a crown ring threaded upon said base element and having shoulder means provided for being positioned with respect to said latch housing so that the extent of threading the crown ring upon the base element determines the extent to which said mushroom headed posts project from said latch housing; and handle means connected to said end of said cylindrical post and having two operating positions wherein in one operating position said cylindrical post is retracted while in the other position the cylindrical post is protracted, and the handle means rests in between the prongs of the crown ring for preventing said crown ring from turning.

2. Rapid action clamping element as in claim 1 wherein said spring biasing said cylindrical post bears against said plate, said handle means being constructed to lock the retraction of the cylindrical posts into position as against compression of the spring.

3. Rapid action clamping element as in claim 1 including spring means interposed between said base element and said latch housing, said spring providing pressure against which the crown ring upon turning retracts the base element so that the heads of the mushroom headed posts are forced and held against the slot track after insertion.

4. Rapid action clamping element as in claim 2 wherein said lever when in said second position rests in between two prongs of said crown ring.

* * * * *